(12) United States Patent
Corey et al.

(10) Patent No.: US 10,527,320 B2
(45) Date of Patent: Jan. 7, 2020

(54) CRYOCOOLER WITH MAGNETIC RECIPROCATING PISTON

(71) Applicant: Chart Inc., Ball Ground, GA (US)

(72) Inventors: John A. Corey, Melrose, NY (US); Douglas Alan Wilcox, II, Ball Ground, GA (US)

(73) Assignee: Chart Inc., Ball Ground, GA (US)

( * ) Notice: Subject to any disclaimer, the term of this patent is extended or adjusted under 35 U.S.C. 154(b) by 0 days.

(21) Appl. No.: 16/005,340

(22) Filed: Jun. 11, 2018

(65) Prior Publication Data

US 2018/0356131 A1    Dec. 13, 2018

Related U.S. Application Data

(63) Continuation of application No. 14/450,142, filed on Aug. 1, 2014, now abandoned.
(Continued)

(51) Int. Cl.
*F25B 9/00* (2006.01)
*F25B 9/14* (2006.01)
(Continued)

(52) U.S. Cl.
CPC ............ *F25B 9/14* (2013.01); *F04B 35/004* (2013.01); *F04B 35/04* (2013.01); *H02K 33/16* (2013.01); *F25B 2309/001* (2013.01)

(58) Field of Classification Search
CPC ... F25B 9/14; F25B 9/145; F03G 7/00; H02K 3/32; H02K 3/38; H02K 33/00; F04B 35/04; F04B 35/004
See application file for complete search history.

(56) References Cited

U.S. PATENT DOCUMENTS

| 4,697,113 A | 9/1987 | Young |
| 6,698,423 B1 | 3/2004 | Honkonen et al. |
| (Continued) | | |

FOREIGN PATENT DOCUMENTS

| CN | 101603464 A | 12/2016 |
| JP | 2001251835 A | 9/2001 |
| (Continued) | | |

OTHER PUBLICATIONS

International Preliminary Report on Patentability for Application No. PCT/US2014/049484, dated Feb. 2, 2016.
(Continued)

*Primary Examiner* — Frantz F Jules
*Assistant Examiner* — Erik Mendoza-Wilkenfel
(74) *Attorney, Agent, or Firm* — Cook Alex Ltd.; R. Blake Johnston

(57) ABSTRACT

A cryocooler is described that can include a pressure wave generator, and a refrigeration device (for example, a coldhead), which can be used to liquefy a gas when the gas is exposed to a surface of the refrigeration device. The pressure wave generator can include one or more motors. Each motor can include a stator, and at least one electrical coil wound around a portion of the stator. The electrical coil can generate a reversing magnetic field when alternating electric current is passed through the electrical coil. The motor can further include a pressurized container that can be placed within the space enclosed by the stator, and a piston that can be placed inside the pressurized container. The stators can be placed external to the pressurized container. The piston is made by combining magnets that have opposite and transverse polarities, and are combined adjacently on a common reciprocating axis.

20 Claims, 12 Drawing Sheets

Related U.S. Application Data

(60) Provisional application No. 61/861,588, filed on Aug. 2, 2013.

(51) Int. Cl.
*H02K 33/00* (2006.01)
*H02K 33/16* (2006.01)
*H02K 3/32* (2006.01)
*H02K 3/38* (2006.01)
*F04B 35/04* (2006.01)
*F04B 35/00* (2006.01)

(56) References Cited

U.S. PATENT DOCUMENTS

| | | | | |
|---|---|---|---|---|
| 7,347,053 | B1* | 3/2008 | Haberbusch | F25B 9/145 62/49.2 |
| 2001/0028200 | A1* | 10/2001 | Hwang | B60L 15/005 310/12.29 |
| 2004/0170513 | A1 | 9/2004 | Nara et al. | |
| 2006/0277925 | A1* | 12/2006 | Matsubara | F25B 9/145 62/6 |
| 2009/0133397 | A1* | 5/2009 | Owens | F02G 1/0435 60/520 |
| 2012/0207628 | A1* | 8/2012 | Al Otaibi | F04B 35/04 417/415 |

FOREIGN PATENT DOCUMENTS

| | | |
|---|---|---|
| RU | 2235216 C1 | 8/2004 |
| RU | 2406853 C1 | 12/2010 |
| SU | 1028349 A | 7/1983 |
| SU | 1159380 A1 | 7/2006 |
| WO | 19910059489 A1 | 5/1991 |
| WO | 199858219 A1 | 12/1998 |
| WO | 199910687 A1 | 3/1999 |
| WO | 1999028685 A1 | 6/1999 |
| WO | 20110105190 A1 | 9/2011 |

OTHER PUBLICATIONS

International Search Report and Written Opinion of the International Search Authority for Application No. PCT/US2014/049484, dated Nov. 6, 2014.

Office Action of the State Intellectual Property Office of the People's Republic of China [Chinese and English Translation] for Application No. CN201480041536.4, dated Sep. 21, 2018.

Office Action from the Japanese Intellectual Property Office for Application No. 2016-531943, dated Sep. 5, 2018.

* cited by examiner

CRYOCOOLER WITH MAGNETIC RECIPROCATING PISTON

RELATED APPLICATIONS

This patent application is a Continuation of U.S. patent Ser. No. 14/450,142, filed Aug. 1, 2014, which claims priority to U.S. Provisional Patent Application Ser. No. 61/861,588, filed Aug. 2, 2013, the contents of each of which are incorporated herein by reference in their entirety.

TECHNICAL FIELD

The subject matter described herein relates to a cryocooler including a pressure wave generator, and a refrigeration device (for example, a cold-head), which may be used to liquefy a gas when the gas is exposed to a surface of the refrigeration device. More particularly, the pressure wave generator includes one or more reciprocating motors, with electromagnetic stator external to a pressurized container, each of which includes a magnetic piston made of magnets having transversely opposite polarities, the piston being configured to slide within the pressurized container while minimizing friction between the piston and the pressurized container.

BACKGROUND

A large number of patients suffer from respiratory diseases, such as chronic obstructive pulmonary disease (COPD). Due to diminished effectiveness of lungs of such patients, those patients require supplemental oxygen support for comfort and activity. Typically, the oxygen used by these patients is provided as pressurized gas, or as liquefied oxygen, which enables more compact and lightweight storage than gaseous oxygen, and is especially useful during patient mobility. Although most liquid oxygen is delivered from central sources, on-site liquefying of oxygen has been known to be performed by conventional cryocoolers. Such conventional cryocoolers include a refrigeration cycle that is powered by a motor. Such a motor includes a stator and a piston, both of which are incorporated along with numerous other elements (for example, various elements made of high permeability materials, such as iron, electrical steel, yoke, and other like materials) within a pressurized vessel to contain the high-purity working gas within, typically ultra-pure helium that remains gaseous at low temperatures when all other substances become liquid or solid. The structure of this traditional motor is very complex, and the electromagnetic stator, which may suffer failures in wires or their insulation, can be repaired or replaced only by breaking or opening the pressurized vessel. Accordingly, the conventional motors and associated cryocoolers are very expensive.

SUMMARY

In one aspect, a motor is described that can include a stator, an electrical coil, a pressurized container, and a piston. The stator can define a space interrupting a circuit of high magnetic permeability material. An electrical coil can be wound around a portion of the stator. The electrical coil can generate a reversing magnetic field in the stator and in the space defined by the stator when alternating electric current is passed through the electrical coil. The pressurized container can be placed within the space enclosed by the stator. The piston can be placed inside the pressurized container. The piston can slide within the pressurized container in response to the reversing magnetic field.

In some variations, one or more of the following can be implemented individually or in any feasible combination. The piston can include a combination of a first magnet and a second magnet that have opposite and transverse polarities. The first magnet and the second magnet can be combined on a common axis. Each of the first magnet and the second magnet can be cylindrical. A substantial portion of the pressurized container can be cylindrical. A diameter of each of the first magnet and the second magnet can be substantially equal to an inner diameter of the cylindrical portion of the pressurized container. A distance between a surface of the space defined by the stator and an outer surface of at least one of the first magnet and the second magnet can be less than two millimeters. At least a circumferential portion of the piston can be coated with a low friction material that can minimize friction between the outer surface of the piston and an inner surface of the pressurized container when the piston slides within the pressurized container. The sliding of the piston within the pressurized container can be a resonant reciprocating motion.

The pressurized container can be connected to a cold-head including a phasing network. The resonant reciprocating motion of the piston within the pressurized container can cause an oscillating flow of a working fluid within the pressurized container and the phasing network. The oscillating flow of the working fluid within the phasing network can cause a lowering of temperature of at least some portion of the cold-head. The lowered temperature of the at least some portion of the cold-head can cause a liquefaction of a gas exposed to an external surface of the cold-head. The working fluid can include at least one of: helium, hydrogen, ambient air, carbon dioxide, and argon. The gas that is liquefied by exposure to the external surface of the cold-head can be oxygen.

The pressurized container can be made of a low-conductivity and non-ferromagnetic material. The low-conductivity and non-ferromagnetic material can be one of: stainless steel, Inconel, glass, carbon, and titanium alloy. The piston can include a plurality of magnets that link with the stator to generate a restoring force tending to return the piston to a mid-stroke position of the piston. The stator and the electrical coil can be located in ambient air when the piston slides within the pressurized container due to the reversing magnetic field. The stator can be removable and replaceable without opening or breaking the pressurized container.

In another aspect, a system is described that can include a pressure wave generator, and an acoustic load fluidically coupled with the pressure wave generator. The pressure wave generator can include one or more motors. At least one motor of the one or more motors can include a stator, an electrical coil, a pressurized container, and a piston. The stator can define a space interrupting a circuit of high magnetic permeability material. The electrical coil can be wound around a portion of the stator. The electrical coil can generate a reversing magnetic field in the stator and the space defined by the stator when alternating electric current is passed through the electrical coil. The pressurized container can be placed within the space enclosed by the stator. The piston can be placed inside the pressurized container. The piston can reciprocate within the pressurized container in response to the reversing magnetic field.

In some variations, one or more of the following can be implemented individually or in any feasible combination. The acoustic load can be at least one of: a Stirling cycle refrigerator and a pulse-tube acoustic-Stirling refrigerator. In one example, the acoustic load can be a compressor head. The one or more motors can include at least two motors. The at least two motors can be functionally combined to cancel mechanical vibration in the pressure wave generator. The pressurized container can be a part of a gas-tight enclosure open to only the acoustic load. The acoustic load can include a phasing network. The pressurized container can be connected to the cold-head. The reciprocating motion of the piston within the pressurized container can cause an oscillating flow of a working fluid within the pressurized container and the cold-head. The oscillating flow of the working fluid within the acoustic load can cause a lowering of temperature of a portion of the acoustic load. The lowered temperature of a portion of the acoustic load can cause a liquefaction of a gas exposed to an external surface of the acoustic load.

In yet another aspect, a system is described that can include a gas source configured to separate a gas from a mixture of gases, and a cryocooler configured to receive the separated gas from the gas source in order to liquefy the gas. The cryocooler can include a pressure wave generator and a refrigerating device that liquefies the gas when the gas is exposed to an outer surface of the refrigeration device. The pressure wave generator can include at least one reciprocating motor. The at least one reciprocating motor can include a stator defining a space. An electrical coil can be wound around a portion of the stator. The electrical coil can generate a reversing magnetic field in the stator and in the space defined by the stator when alternating electric current is passed through the electrical coil. The at least one reciprocating motor can further include a pressurized container that can be placed within the space defined by the stator. The pressurized container can enclose a piston such that the piston reciprocates by sliding within the pressurized container in response to the reversing magnetic field.

In some variations, one or more of the following can be implemented individually or in any feasible combination. The refrigerating device can include a phasing network. The reciprocating of the piston within the pressurized container can cause an oscillating flow of a working fluid within the pressurized container and the refrigeration device. The oscillating flow of the working fluid within the refrigerating device can cause a lowering of temperature of a portion of the refrigerating device. The lowered temperature of the portion of the refrigerating device can cause a liquefaction of a gas exposed to an external surface of an acoustic load that includes the phasing network. The system can further include a storage vessel that can collect and store the liquefied gas. The gas source can be an air separation device that separates the gas from a plurality of gases. In one example, the air separation device can be a molecular sieve. In another example, the air separation device can include a heat exchanger including a plurality of heat exchanger channels. The mixture of gases can include gases compressed by a compressor. The gas source can receive the mixture of gases from the compressor. The mixture of gases can be ambient air. The separated gas can be gaseous oxygen. The liquefied gas can be liquid oxygen that is to be provided to at least one medical device used by one or more patients.

Related apparatuses, systems, methods, techniques and articles are also described.

The subject matter described herein provides many advantages. For example, the motor of the cryocooler being external to the pressurized container advantageously enables the stator to be removed and replaced without breaking into the pressurized volume encapsulated by the pressurized container. The removability and replaceability of the stator without breaking the pressurized container can enhance the time of continual operability of the cryocooler without requiring major servicing or maintenance, and can significantly lower the cost of the cryocooler. Advantageously, the external stator provides for improved cooling of the resistive heat resulting from current in the wires of the windings, and eliminates the need for a costly and delicate electrical feed-through in the pressure vessel, otherwise necessary to carry current to internal motor windings. Further, the pressurized container encapsulating only the piston (including any non-magnetic caps thereon, such as aluminum caps that serve as manufacturing aids and end-of-stroke bumpers) advantageously provides a simple and mostly tubular structure that is much smaller and lighter in weight than a vessel large enough to enclose entire motors within, and so is easy to manufacture. Furthermore, the structure and materials of the cryocooler described herein can ensure an operating life of several years without maintenance, which can be important because an average duration for treating a respiratory disease such as chronic obstructive pulmonary disease (COPD) can be two to three years.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

When practical, like reference numerals and/or reference symbols in the various drawings indicate like elements.

DETAILED DESCRIPTION

Figure 1:
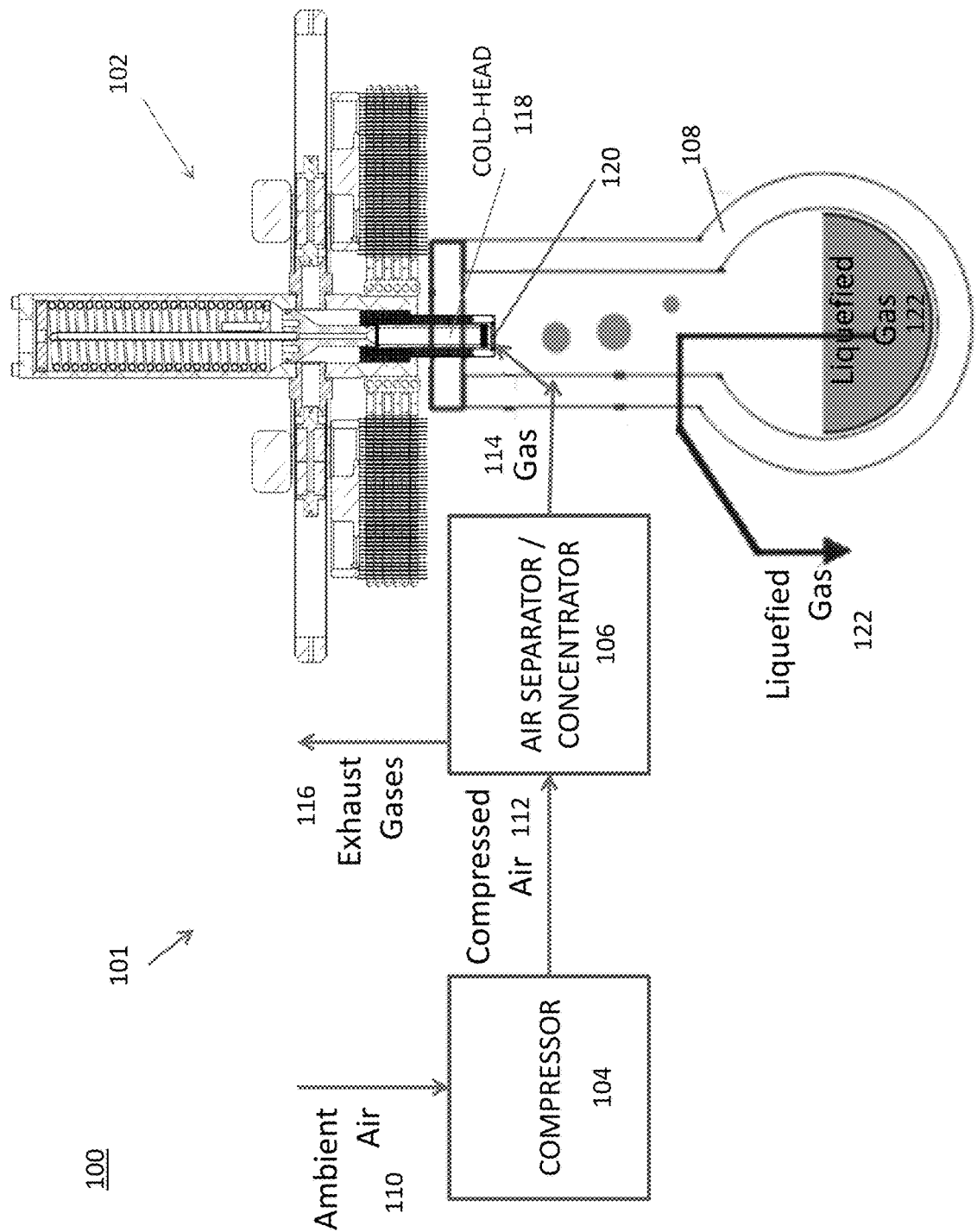
FIG. 1 is a diagram illustrating a system including a cryocooler that is used to liquefy gas, such as oxygen.

FIG. 1 is a diagram 100 illustrating a system 101 including a cryocooler 102 that is used to liquefy gas, such as oxygen. The system 100 can further include a compressor 104, an air separator (for example, a concentrator, such as a pressure-swing adsorbent oxygen concentrator; and also referred to as an air separation device) 106, and a storage vessel (for example, a flask, such as dewar) 108. The compressor 104 can receive ambient air 110, which can be a mixture of about 78% nitrogen, about 21% oxygen, the remaining 1% composed of carbon dioxide, methane, hydrogen, argon, and helium. The compressor 104 can compress the ambient air 110 to form compressed air 112. The air separator 106 can receive the compressed air 112 from the compressor, and substantially separates a required gas 114, such as oxygen, from other gases (for example, nitrogen, carbon dioxide, methane, hydrogen, argon, and helium) within the compressed air 112. The air separator 106 can exhaust these other gases, which are accordingly also referred to as exhaust gases 116. The cryocooler 102 can include a refrigeration device (for example, a cold-head, which can be configured with a salient cold-finger) 118 with an external surface (for example, a cold tip) 120. When the gas 114 touches the external surface (for example, cold tip) 120, the gas 114 can get liquefied to form liquefied gas 122. The storage vessel 108 can store the liquefied gas 122. The liquefied gas 122 can be extracted from the storage vessel 108 as and when required.

The cryocooler 102 is a refrigerator, which can liquefy the gas 114 at temperatures below about one hundred and fifty Kelvin (150K). While performing this liquefaction, the cryocooler 102 can reject heat to common ambient temperatures between about zero degree Celsius and about forty degrees Celsius.

Diagram 200 (discussed below) describes a refrigeration process performed by the cryocooler 102 and the structural elements of such a cryocooler; diagram 300 (discussed below) describes an alternate system that can be used instead of the system 101 discussed above; diagrams 400 and 500 (discussed below) describe one reciprocating motor of two reciprocating motors within a preferred implementation of cryocooler 102; diagram 600 (discussed below) describes a magnetic piston used within each reciprocating motor of the cryocooler 102; diagram 700 illustrates another figure of the magnetic piston used within each reciprocating motor; diagram 800 (discussed below) describes an exploded view of components used to construct the preferred implementation of the cryocooler 102; diagram 900 (discussed below) describes an inner structure of the preferred implementation of the cryocooler 102; diagram 1000 (discussed below) describes an external view of the preferred implementation of the cryocooler 102; and each of diagrams 1100 and 1200 (discussed below) describe a possible configuration of a stator and electrical coil(s) within each reciprocating motor of the cryocooler 102.

The liquefied gas 122 can be liquefied oxygen, which can be extracted from the storage vessel 108 and provided to oxygen receiving devices, such as portable liquid oxygen bottles with oxygen vaporizers (or revaporizers) and associated inhalators used by patients. These patients can be individuals suffering from respiratory diseases, such as a chronic obstructive pulmonary disease (COPD).

The air separator 106 can include a molecular sieve. In another implementation, the air separator can include a plurality of heat exchanger channels configured to transport one or more gases, as described by diagram 400 discussed below.

Figure 2:
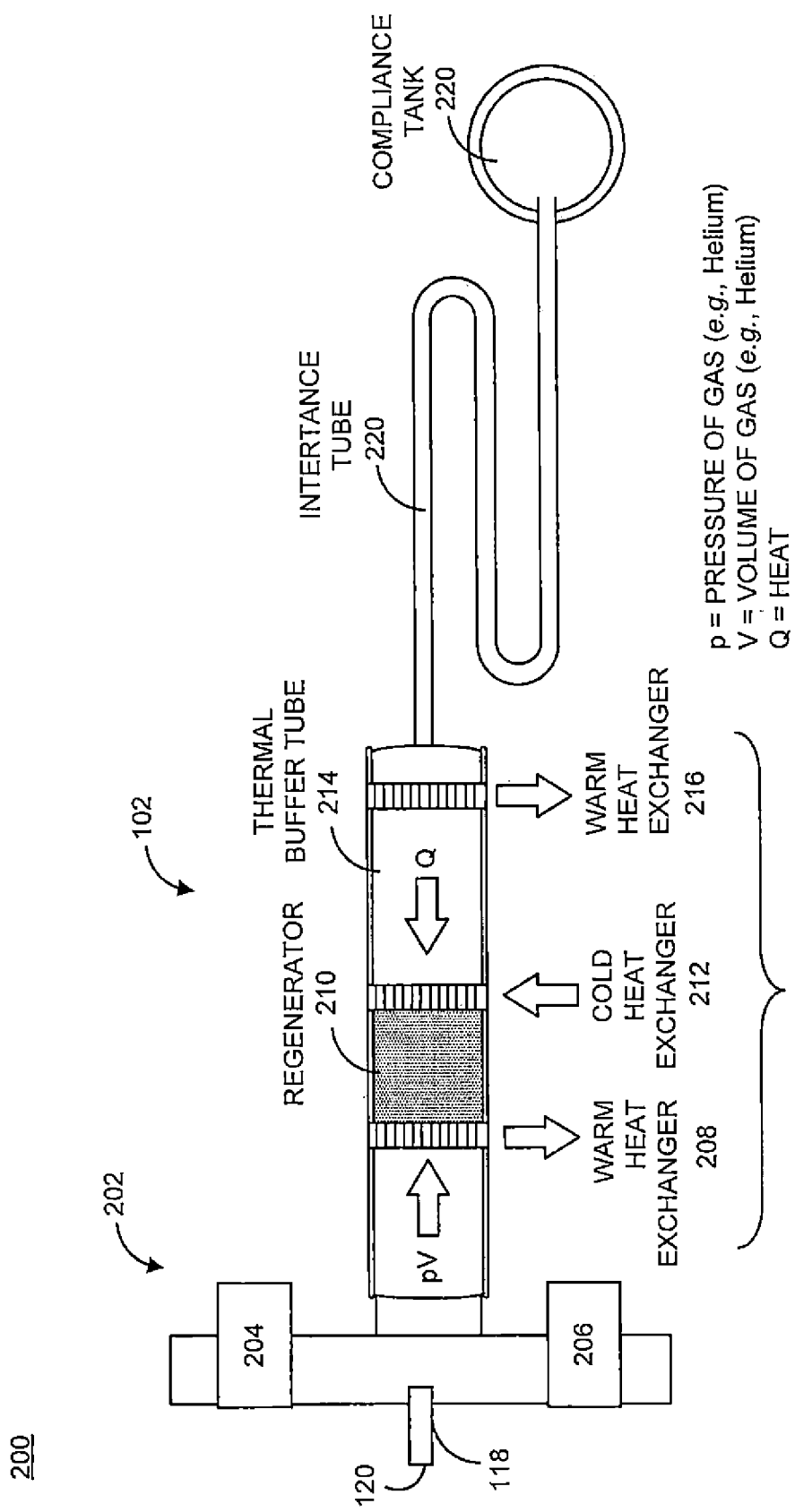
FIG. 2 is a diagram illustrating a refrigeration process and associated structural aspects of the cryocooler.

FIG. 2 is a diagram 200 illustrating a refrigeration process and associated structural aspects of the cryocooler 102. The cryocooler 102 can include a pressure wave generator 202 and a compact refrigeration device (for example, cold-head) 118. The pressure wave generator 202 can be driven by linear reciprocating motors 204 and 206, each of which is described in more detail below by diagrams 500 and 600. The refrigeration device 118 can be an acoustic Stirling (pulse-tube) cold-head. The refrigeration device 118 can include a warm heat exchanger 208, a regenerator 210, a cold heat exchanger 212, a thermal buffer tube 214, a second warm heat exchanger 216, an inertance tube 218, and a compliance tank 220. In some implementations, the refrigeration device 118 can be folded over at the cold heat exchanger 212 to create a salient cold zone (that is, the cold tip 120).

The refrigeration process performed by the cryocooler 102 functions generally as follows. The reciprocating motion of the pistons in the reciprocating motors within the pressure wave generator cyclically compresses and expands a working fluid (for example, helium, or any other similar one or more gases in other implementations) relative to a mean pressure (charge pressure) within the cryocooler 102. With each forward stroke of the pistons, some working fluid moves through the warm heat exchanger 208, where heat is removed. The working fluid continues through the regenerator 210, which precools the working fluid before reaching the cold heat exchanger 212. As the working fluid moves towards the cold heat exchanger 212, gas in the acoustic network (which includes the thermal buffer tube 214, the second warm heat exchanger 216, and the reservoir 220) can also move in the same direction, driven by the increased pressure from piston forward movement towards the distant compliance tank. Even as the local working fluid in the region of the pistons and heat exchangers stops advancing when the pistons reach their upper limits, the working fluid within the acoustic network continues moving, driven by its own inertia in the high-speed inertance tube 218 and the nearly constant mean pressure in the compliance tank. This movement of the working fluid in the inertance tube 218 acts like a virtual piston, moving away from the cold exchanger 212, and expanding the working fluid in that area. As the working fluid expands, it gathers heat from its surrounding surfaces and external load, for example the gas 114 that is exposed to those surfaces and that is to be cooled or liquefied. When the pistons begin withdrawing, locally lowering pressure below the mean, much of the working fluid then moves back through the regenerator 210 and the warm heat exchanger 208. Still delayed by its inertia, working fluid in the acoustic network later follows, again acting as a virtual piston, to drive more fluid into the warm region, and the cycle begins again with compression at the warm zone. The reciprocating motors of the cryocooler 102 and the warm rejection heat exchangers 208 and 216 can be cooled by local air, water, and/or an optional closed loop cooling system that can include a reservoir, a pump, and a liquid-to-air heat exchanger. Heat exchanger 212 is the cold region which is refrigerated, and accordingly provides cooling to any load thermally coupled there.

Figure 3:
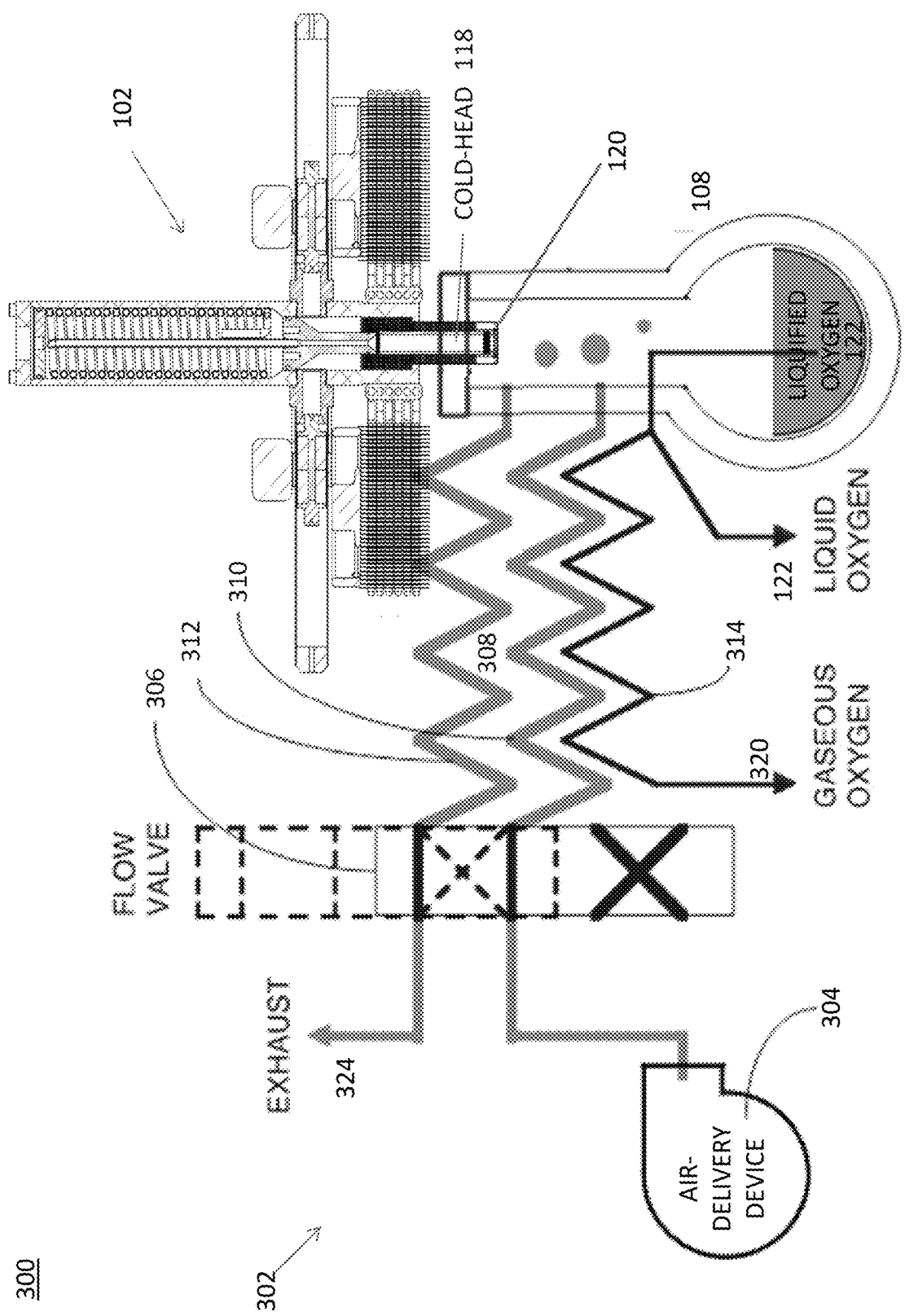
FIG. 3 is a diagram illustrating an alternate system that includes the cryocooler.

FIG. 3 is a diagram 300 illustrating an alternate system 302 that includes the cryocooler 102. The system 302 can include: an air-delivery device 304 (for example, an air pump or a blower); a flow-control valve 306; a recuperative heat exchanger 308 including a first channel 310, a second channel 312, and a third channel 314; a storage vessel 108; a cryocooler 102; a gaseous oxygen outlet 320; a liquefied oxygen outlet 122; and an exhaust/waste-air outlet 324.

The air-delivery device 304 can provide a continuous flow of air that can include nitrogen, oxygen, traces of argon, water vapor, carbon dioxide, and other minor elements. The air can be directed into the first channel 310 of the heat exchanger 308, where it can give up heat to a gas stream in the second channel 312 and possibly a gas stream in the third channel 314. As the air in the first channel 310 loses heat, a temperature of the air can drop. When the temperature of air in the first channel 310 drops, some components (for example, water and carbon dioxide) of this air can condense or freeze, as their temperatures (noted below) of phase-change are significantly higher than those temperatures (noted below) of other components such as nitrogen, oxygen, and argon. For example: water has a normal condensation temperature of 273K, and fraction in standard atmosphere between 0.1 and 2.8%; carbon dioxide has a normal condensation temperature of 195K, and fraction in standard atmosphere of 0.035% (CO2 directly freezes and sublimes, no liquid phase); oxygen has a normal condensation temperature of 90.2K, and fraction in standard atmosphere of 20.95%; argon has a normal condensation temperature of 87.3K, and fraction in standard atmosphere of 0.93%; and nitrogen has a normal condensation temperature of 77.4K, and fraction in standard atmosphere of 78.1%.

The remaining cooled gases (that is, nitrogen, argon, oxygen, and traces) can pass into the cryogenic storage vessel 108 where they can be exposed to a refrigerated surface cooled to a temperature approximately between eighty Kelvin and ninety Kelvin by the cryocooler 102. The heat extracted from the gases by heat transfer to that surface can condense the oxygen, the argon, and a small amount of the nitrogen in the solution. The uncondensed nitrogen along with traces of oxygen, argon and other minor constituents can pass through the storage vessel 108, and can reenter the second channel 312 of the heat exchanger 308. In the second channel 312, the nitrogen along with traces of oxygen, argon and other minor constituents can absorb heat from the incoming stream in the first channel 310. The gas stream can then pass through the flow-control valve 306, and can then exit through the exhaust outlet 324. The oxygen-rich liquid condensate can be partially accumulated in the storage vessel 108, and can be partially directed through the third channel 314 of the heat exchanger 308. The oxygen-rich liquid condensate in the third channel 314 can be exited, as per consumption requirements, through gaseous oxygen outlet 320. The accumulated condensate can be stored until required (for example, required for consumption by a mobile patient), and then drawn off as a liquid for consumption, when required.

As the warmer condensates in the heat exchanger 308 accumulates from continuing flow of incoming air, the pressure required to maintain flow can rise. A controller (not shown) can switch the flow-control valve 306 to an alternate position when one of the following occurs: such a rise in pressure, a reduction of flow at a fixed pressure, and a passage of a preset interval of time. The switching of the flow-control valve 306 to the alternate position can reverse the respective connections between air inlet and exhaust for the first channel 310 and the second channel 312. This reversal can enable the re-entrainment of warmer condensates while maintaining the open channels and free air flow through the heat exchanger 308.

In some variations of the system 302, one or more of the following can be implemented either individually or in any feasible combination. The air-delivery device 304 can be on the other side of the exhaust outlet 324 to draw the flow rather than push the flow. The heat exchanger 308 can be oriented to enable gravity to assist in collecting and removing liquids condensed in the heat exchanger 308, and especially with high-surface filling elements to assist in separation of species (for example, a fractionator). The system 302 can allow an occasional, as needed, addition of an auxiliary electric defrost cycle. The system 302 can include more valves for controlling the dispensing of gaseous and liquid product. The system 302 can further include a second portable storage vessel (for example, dewar) or a liquid oxygen tap. The system 302 can include a rehumidifer to add back some of the condensed water to the oxygen stream. The system 302 can include a pre-purifier, such as a filter and/or a concentrator. The gaseous oxygen tap and the third channel 314 of the heat exchanger 308 can be eliminated in applications where liquid oxygen may be the only desired product.

In a few variations, one or more of the following can be implemented individually or in any possible combination. The exhaust air, which can be still cooler than ambient flow due to imperfect heat exchange, can be used as the cooling air flow for the cryocooler heat rejection. Thus, a dual use of the air pump can be obtained and the cooler efficiency can be improved by lowering rejection temperature. Conversely, the inlet air can be drawn over the cooler rejection surfaces first, thereby increasing the temperature difference between exchanger streams to allow a smaller exchanger for lower cost. The heat exchanger can be positioned in parallel with and in thermal contact with the refrigeration device (for example, a cold-head) 118, thereby sharing thermal gradients and providing some portion of the required refrigeration at effectively higher temperatures (along the gradient) and correspondingly higher efficiency. For purposes (for example, welding) where only gaseous oxygen is required, the storage vessel 108 can be omitted, retaining only a small condensing chamber to separate the liquid oxygen from the other gases, before re-vaporizing the oxygen in the third channel 314 of the heat exchanger 308.

In some variations, one or more of the following can be implemented individually or in any possible combination. The system 302 can be used to purify other species from mixtures other than air. For example, the system 302 can be used to isolate butane from a mixture of hydrocarbons in natural gas by performing a similar sequential condensation with reversing flow-re-entrainment for warmer condensates, and an isolated collection chamber and outlet stream for the desired pure condensate. The airflow rate provided through the system 302 can be controlled with respect to the available cooling capacity and operating temperatures in order to minimize the mass of air that is cooled and re-heated. The flow-control valve 306 can be integrated with the heat exchanger 308, by making, for example, a rotary heat exchanger that slowly turns against an inlet manifold (partly connected to inlet and partly to the exhaust outlet 324 on one end) to bring each of many channels sequentially into contact with the inlet and exhaust on one end, and always in connection to the condensation chamber on the other end.

Although some of the above variations are described for the system 302, these variations can be alternative implementations for the system 101 as well when feasible and practical.

Figure 4:
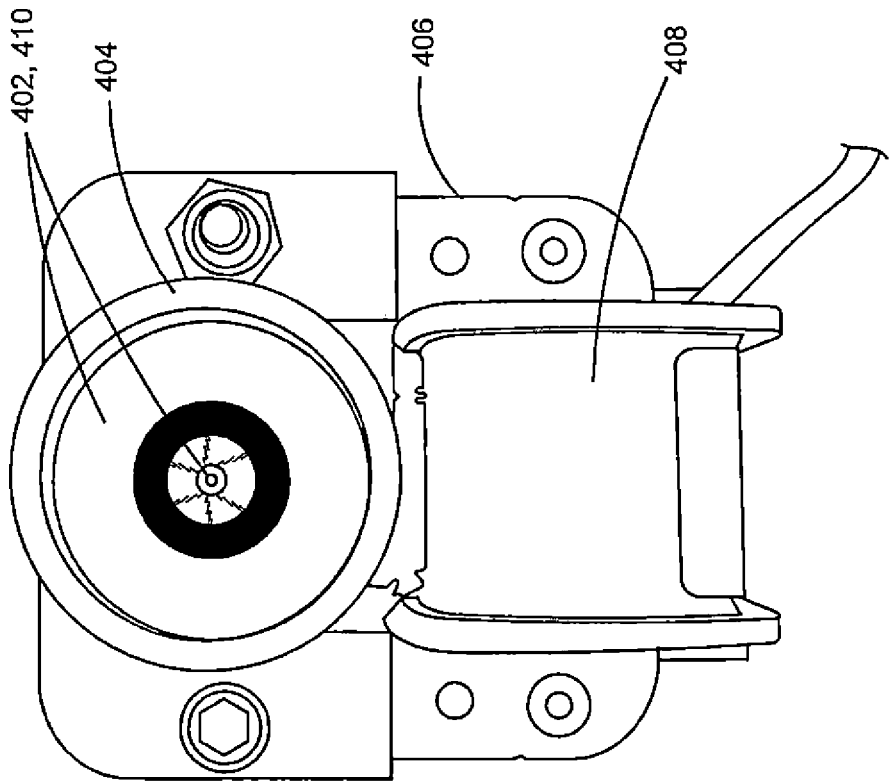
FIG. 4 is a diagram illustrating a reciprocating motor of the two reciprocating motors within the cryocooler.

FIG. 4 is a diagram 400 illustrating a reciprocating motor 204 of the two reciprocating motors 204 and 206 of the cryocooler 102. The reciprocating motor 204 can include a permanent-magnetic piston 402 (as shown more clearly by diagrams 600 and 700 described below) placed within a pressurized container (for example, a gas-tight cylinder, as shown more clearly by diagram 500 described below) 404. The piston 402 is configured to slide linearly within the pressurized container 404. A stator 406 (shown more clearly in diagram 500) can define a pair of magnetic pole faces around an empty space, within which the pressurized container 404 can be placed. One or more electrical coils 408 can be wound around one or more locations of the stator 406. More examples of the shape of the stator core and location of electrical coils 408 with respect to the stator 406 are described by diagrams 1100 and 1200. When electric current is passed through the one or more electrical coils 408, an electromagnetic field is generated in the space between the pole face that either opposes or attracts at least one portion of the magnetic piston, thereby causing a movement of the magnetic piston 402. Application of alternating current in the stator coils 408 therefore impels reversing motion (that is, reciprocation) of the magnetic piston within the container 404, and generally transverse to the main plane of the stator 406.

The magnetic piston 402 can be configured to slide within the pressurized container 404 such that the gap between the piston and the pressurized container 404 is very small. The small gap serves as a gas seal for the piston and ensures an efficient delivery of pressure and flow from the piston, with minimal bypass leakage around the piston. For example, a range of values for a radial width of the gap between the piston 402 and the pressurized container 404 can be between zero microns and twenty five microns.

Because the transverse pull of the magnets is stronger towards the closer pole of the stator 406, and the piston is free to move within it container 404, the piston 402 usually rides towards and touches one side in the cylinder 404 (where the radial clearance can be zero micron) and gets farther away from the other diametrically opposite side in the cylinder 404 (where the radial clearance can be a maximum value, such as twenty five microns). To minimize friction between the side of the piston 402 that constantly touches the cylinder 404, the outer circumferential surface of the piston 402 can be covered with a low-friction material 512 (shown in diagram 600 discussed below), such as a polytetrafluoroethylene (PTFE) compound.

The generally cylindrical piston 402 can include a first magnet portion 602 and a second magnet portion 604 (wherein the magnetic portions 602 and 604 are shown clearly in diagram 600), and the axial ends of the piston 402 can include non-magnetic caps 410 (for example, aluminum caps; and also shown in diagrams 600 and 700) that can allow a manufacturer to more easily handle and process the magnetic piston 402 with ordinary tools. The first magnet 602 and the second magnet 604 are axially adjacent within the piston 402 and can have opposite and transverse polarities.

The two magnets of the magnetic piston 402 can be made of a high strength iron-neodymium material that can minimize moving mass of the piston assembly of the motor 204 or 206. A lower moving mass can be advantageous in view of the following. This moving mass must be moved/swung by a corresponding stiffness to achieve resonance at some frequency, and the momentum of the moving mass causes vibration. A lower moving mass advantageously lowers the vibration, and requires a lighter spring (and lower losses associated with providing that spring, which comes from both magnetic field and gas pressure).

The magnets of the magnetic piston 402 can be axially bored to use a tie-rod through the magnetic piston 402 to coaxially key their centers. The length of the magnets in the piston 402 may be more than (that is, not significantly less than) the length of a stroke of the magnetic piston 402.

The pressurized container 404 can be made of a low-conductivity and non-ferromagnetic material, such as one or more of: stainless steel, Inconel, glass, carbon, titanium alloy, and any other like material. The low-conductivity and non-ferromagnetic material can have a high tensile strength that allows the wall of the pressurized container 404 to be thin, thereby minimizing the running gap between stator 406 and magnetic piston 402 for best flux linking and efficiency. In one alternate implementation, the pressurized container 404 can be made of glass. The pressurized container 404 can allow magnetic flux to pass through, but should be electrically resistive as well as thin to limit the energy waste that results from eddy currents and hysteresis in conductive materials under the influence of changing magnetic flux therein. More particularly, the electrical resistivity of the pressurized container 404 should preferably be more than $5e^{-7}$ Ohm per meter.

The stator 406 can be molded with electrically insulated powders of high magnetic permeability, such as iron. In one implementation, the stator 406 can include laminates of high-permeability material (for example, electrical steel such as M-15 by ARMCO) that is stacked, bonded and wound around with electrical conductors 408. In this case for reciprocation, the total thickness of the stator 402, either molded or axial laminate stack, should be more than the maximum stroke of the magnetic piston 402, which in turn should be less than the length of either magnet 602 or 604.

This thickness of the stator 406 being more than the maximum stroke of the magnetic piston 402 can be advantageous in view of the following reason. The flux linking between the stator 406 and the magnets is nearly linear with respect to the position of the reciprocating piston 402 (normally axially centered with respect to the stator, such as when at rest and not operating), so long as some portion of both magnets remains within the thickness of the stator 406. That is, if the stator thickness aligns half-and-half with each magnet as it normally does when the motor is at rest and not operating, as their common joint is then midway in the stator 406, then the axial force on the magnets is zero. But as the piston reciprocates, and the midline joint between magnets moves away from the mid-plane of the stator, the axial force between piston and stator changes as per the following: as the piston 402 moves (such that a portion of one magnet exits the stator 406 and a corresponding amount of the other magnet enters the stator 406), a restoring force arises to pull the exiting magnet back and that force is proportional to the displacement, so long as an equal amount of one magnet goes out when another comes in. If the thickness of the stator 406 is shorter than the stroke of the piston 402, then this is no longer so, as one magnet will be full out and still moving away, while the other magnet is fully in, aligned with the stator 406, and further motion produces no change in flux links between the piston 402 and the stator 406.

The stator 406 can be air-cooled, and can be adjacent to primary heat rejecters (as also discussed with respect to diagrams 300, 800, and 900) of a thermal section in the cryocooler 102 in order to share air flow and fans. Further, the stator 406 can be removable/replaceable, without breaking into the pressurized volume encapsulated by the pressurized container 404, by sliding off the cylindrical piston enclosure. The magnetic permeability of material forming the stators 406 can be at least one hundred times more than the magnetic permeability of the other nearby materials (for example, a polytetrafluoroethylene (PTFE) compound encapsulating the piston 402, or stainless steel comprising the pressurized container 404). The stators 406 and the associated electrical coil/windings 408 can be placed in ambient air where they are readily cooled and connected to electrical power sources.

In one implementation, an axial length of the piston 402 can be longer than two times the maximum stroke of the piston 402. In some implementations, an axial length of the piston 402 can be longer than an axial length of the stator 406.

Figure 5:
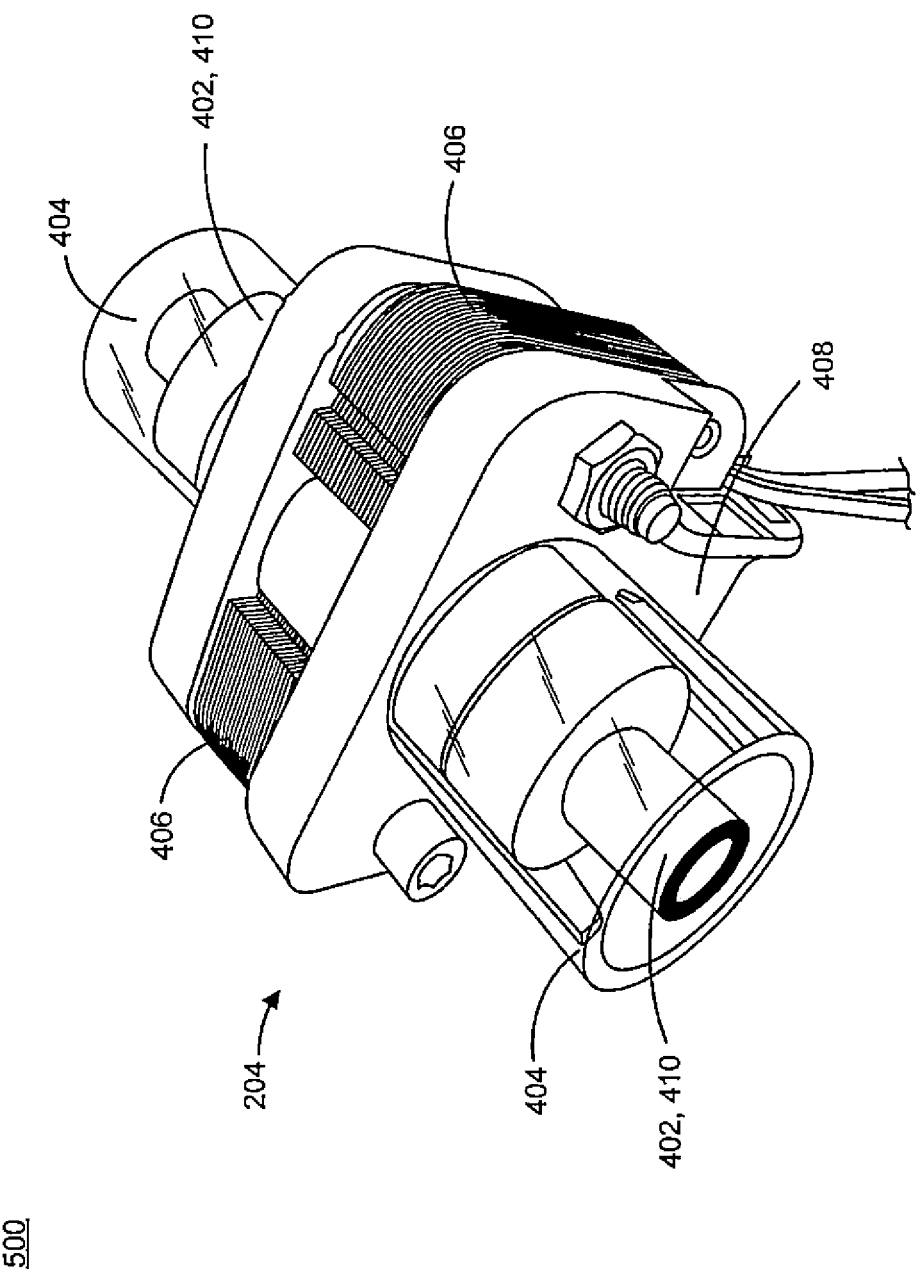
FIG. 5 is a diagram illustrating a perspective view of the reciprocating motor of the cryocooler.

FIG. 5 is a diagram 500 illustrating a perspective view of the reciprocating motor 204 or 206 of the cryocooler 102.

Figure 6:
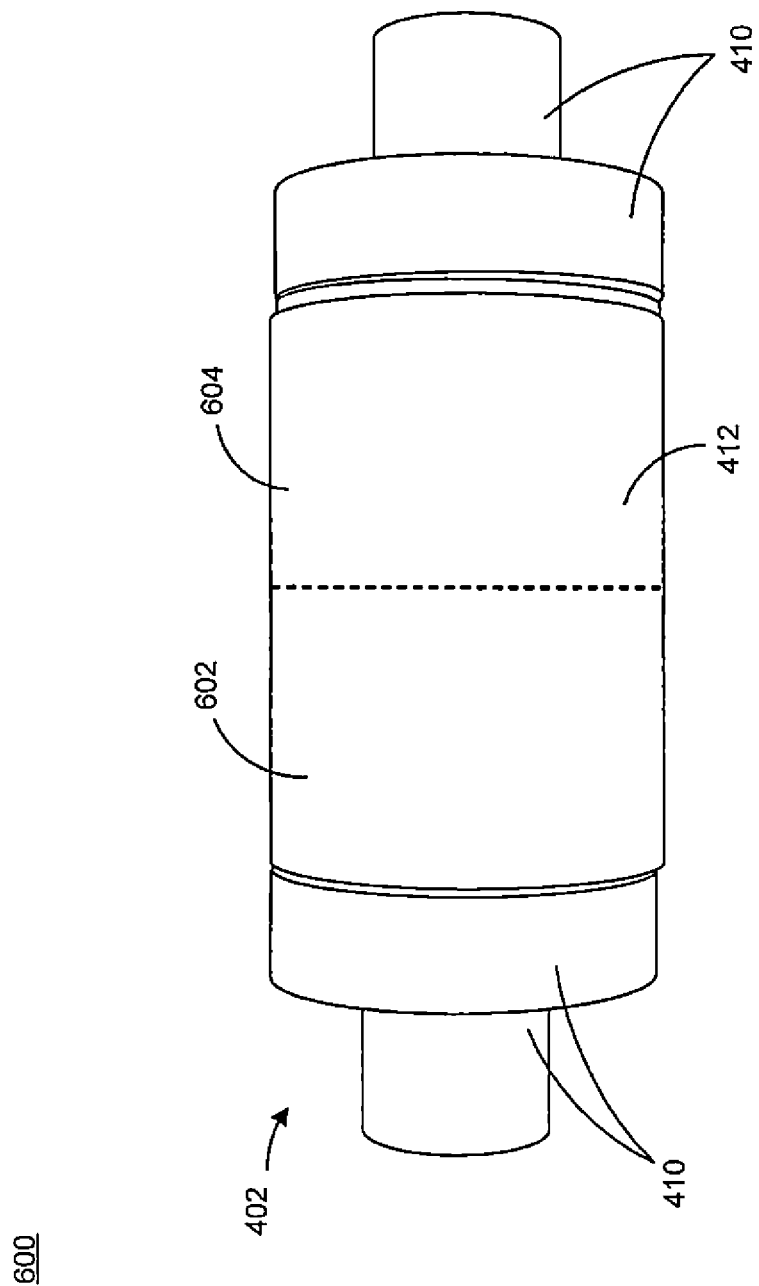
FIG. 6 is a diagram illustrating a magnetic piston of the reciprocating motor within the cryocooler.

FIG. 6 is a diagram 600 illustrating a magnetic piston 402 of the reciprocating motor 204 or 206 of the cryocooler 102. The magnetic piston 402 can include two transversely oriented magnets 602 and 604 that can assert opposite magnetic fields. The magnetic piston 402 can be covered/encapsulated by a low-frictional material 412 (for example, a polytetrafluoroethylene (PTFE) compound) so that the magnetic piston 402 can slide easily within the pressurized container 404 without much friction. A different or same low friction material, which can be another or same polytetrafluoroethylene (PTFE) compound, can be used to cover/encapsulate the non-magnetic caps (for example, aluminum caps) 410. The magnets 602 and 604 can link with the stator 406 to generate a restoring force tending to keep the piston reciprocating about a mid-stroke position of the piston 402 when the piston 502 reciprocates by sliding within the pressurized container 404.

Figure 7:
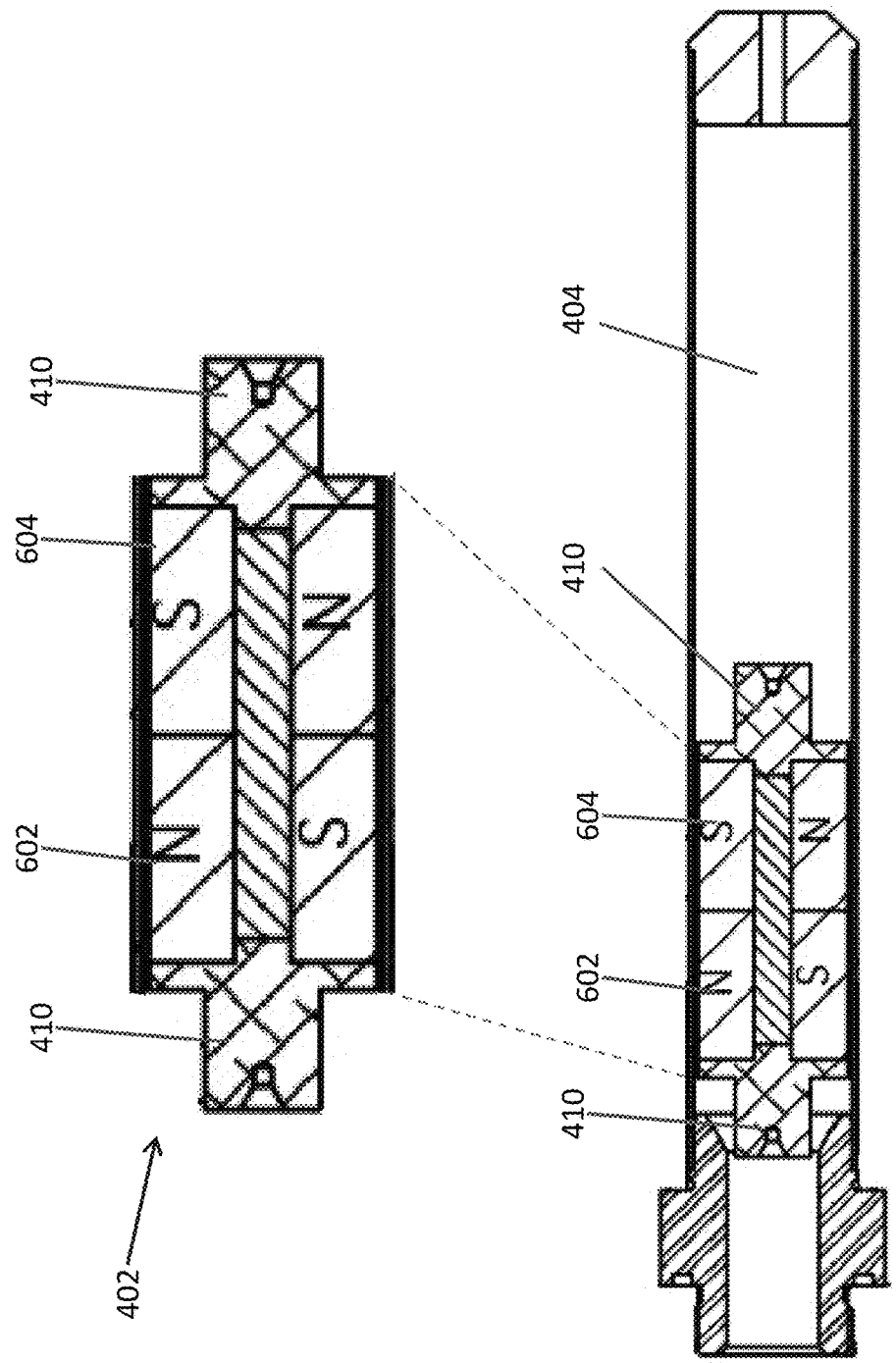
FIG. 7 is a diagram illustrating an interior sectional view of the magnetic piston that is configured to be placed within the pressurized container of the reciprocating motor of the cryocooler.

FIG. 7 is a diagram 700 illustrating an interior sectional view of the magnetic piston 402 that is configured to be placed within the pressurized container 404 of the reciprocating motor 204 or 206 of the cryocooler 102. The pressurized container 404 is configured as a thin walled cylinder that is closed at one end to form a trapped volume of internal working fluid (functioning as a gas spring), and is open at the other end to communicate fluidically with the refrigeration portion of the cryocooler 102, and is closely fitted to the piston 402 within, to provide a seal and thereby cause a pressure wave within the container when piston 402 reciprocates within container 404. The radial width of the gap between the piston 402 and the pressurized container 404 can be between zero microns and twenty five microns, as noted above.

Figure 8:
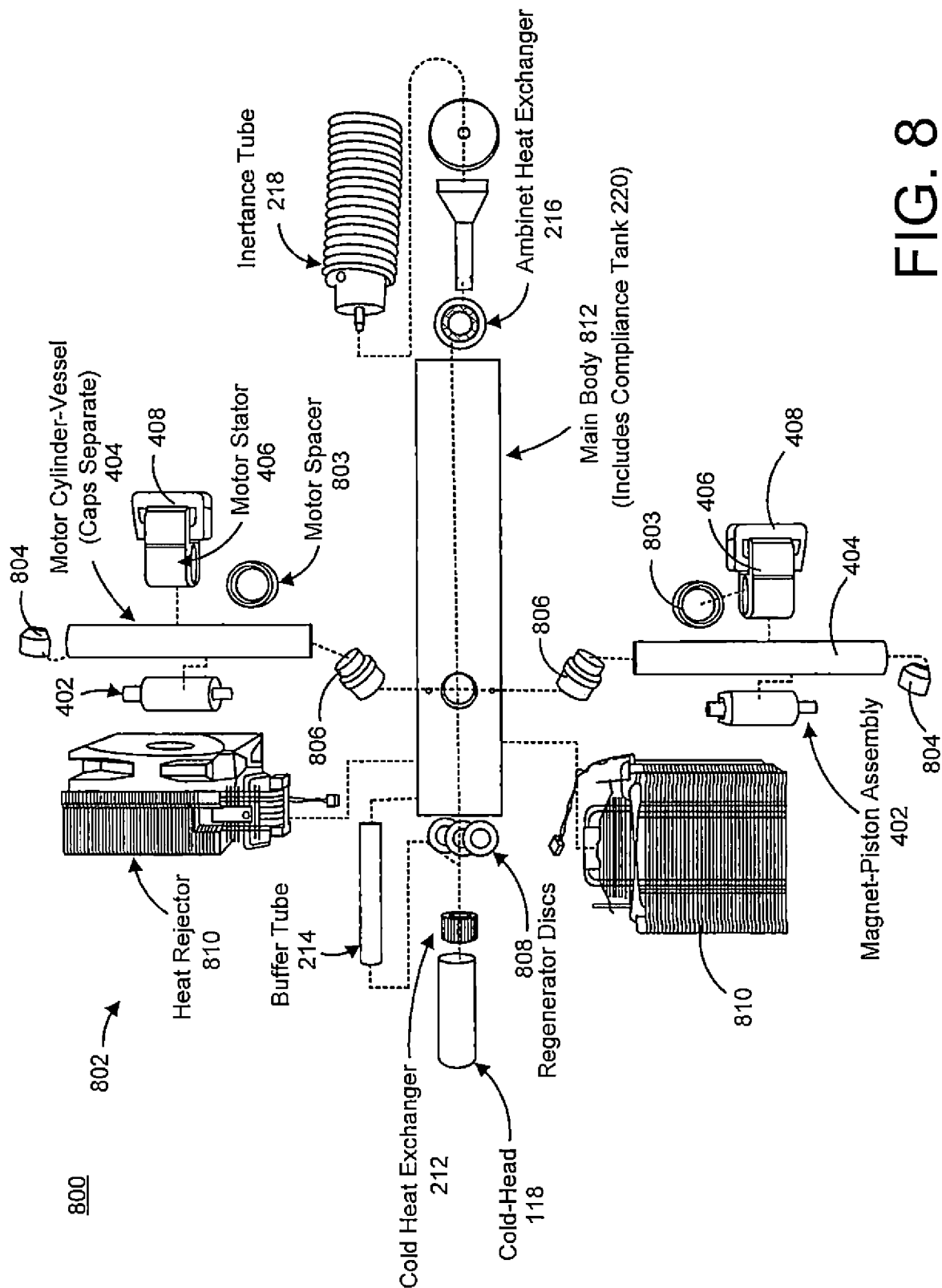
FIG. 8 is a diagram illustrating an exploded view of components used to construct or assemble the cryocooler.

FIG. 8 is a diagram 800 illustrating an exploded view of components 802 used to construct or assemble a preferred implementation of cryocooler 102. The components 802 can be combined to form the cryocooler 102, as shown in diagram 900 discussed below. The components 802 can include: two pistons 402, each piston 402 made of (a) two magnets having opposite and transverse polarities, and (b) two non-magnetic caps (for example, aluminum caps); two cylindrical containers 404 configured to encapsulate the respective pistons 402; motor stators 506, each configured to encapsulate (more specifically, fit closely around a portion of) the respective pressurized container 404; electrical coil 408 wound around a portion of the motor stator 406; motor spacers 803 each configured to position the motor stator 406 over a predetermined location along the container 404; end caps 804 each configured to close the respective pressurized container 404 to ensure that high pressure can be maintained within the pressurized container 404; fittings 806 connected to other ends of the pressurized containers 404, and each fitting 806 having a hole that allows helium (or any other similar gas used as working fluid within cryocooler 102) to pass through the fitting 806. The components 802 further include a refrigeration device (for example, a cold-head) 118, which is to be driven by the pressure waves from the motion of pistons 402 in associated pressurized containers 404 when fluidically coupled to such refrigeration device. The refrigeration device incorporates: a cold heat exchanger 212, regenerator discs 808 (note that three regenerator discs 808 are shown only for reference, and more regenerator discs 808 are required for assembling the cryocooler 102); a buffer tube 214; an ambient heat exchanger 216; and an inertance tube 218. The components 802 include a main body 812, which includes all the components between the refrigeration device 118 and the compliance tank 220, as shown by diagram 900. The components 802 further include heat rejecters 810, wherein each heat rejecter 810 can be placed in the vicinity of (for example, either adjacent to or close to) the ambient heat exchanger 216 of refrigeration device 118 to remove/reject heat from the refrigeration device 118.

Figure 9:
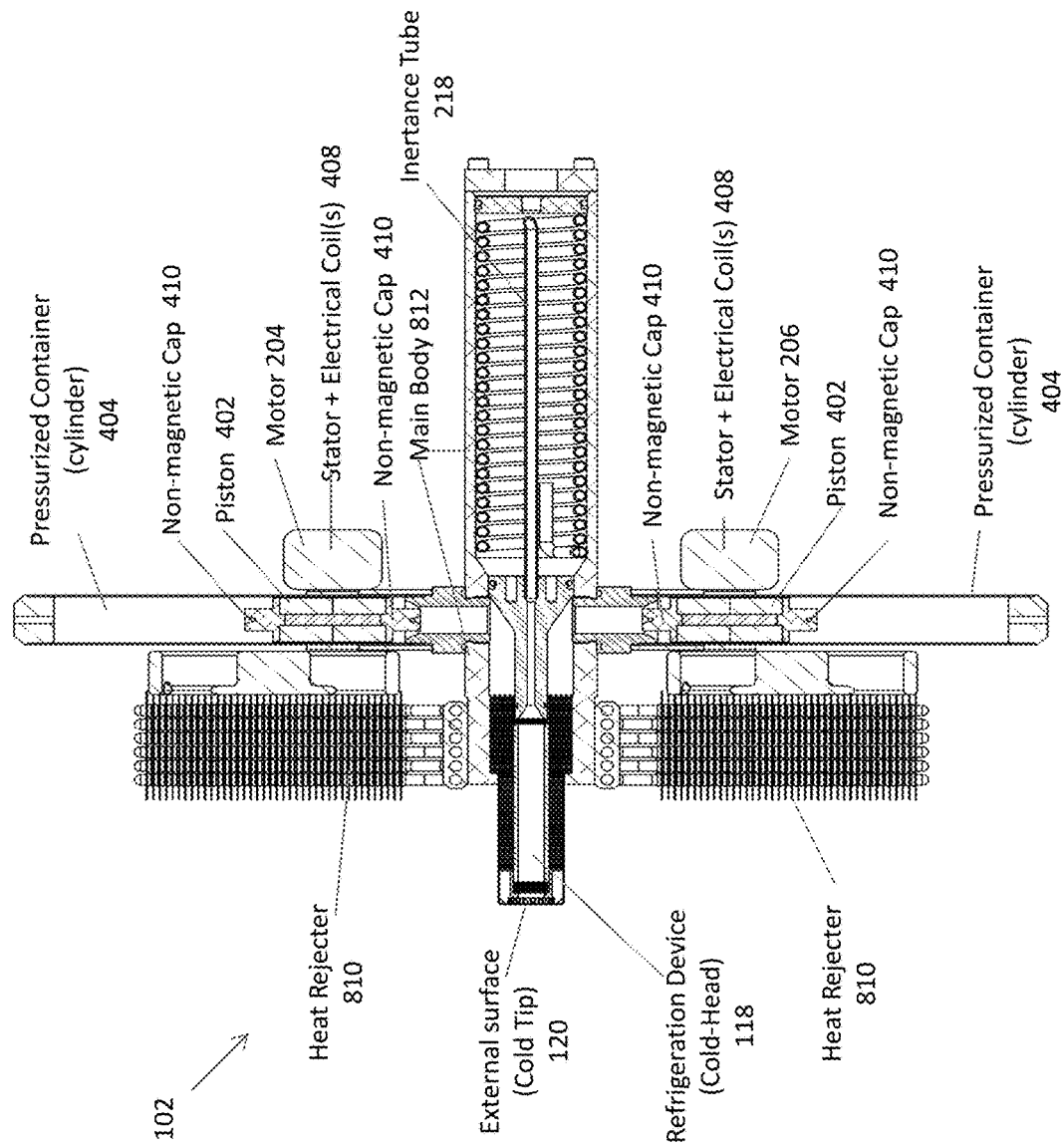
FIG. 9 is a diagram illustrating some components of an assembled cryocooler.

FIG. 9 is a diagram 900 illustrating a sectional view of some components of an assembled cryocooler 102 (which are shown by the exploded view shown in diagram 800).

Figure 10:
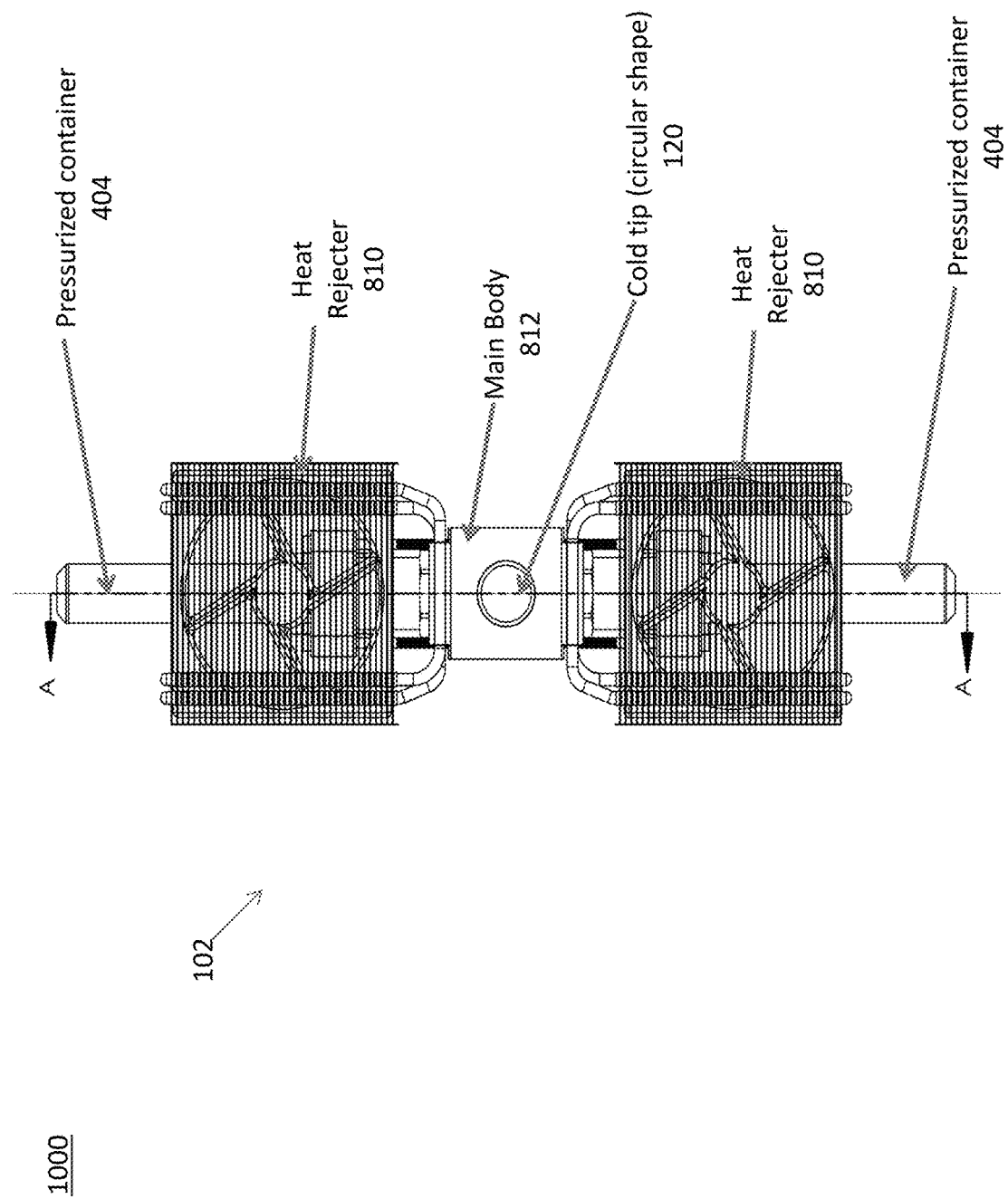
FIG. 10 is a diagram illustrating another view of the cryocooler.

FIG. 10 is a diagram 1000 illustrating another view of the cryocooler 102. The cold-tip 120 practically has a circular shape.

Figure 11:
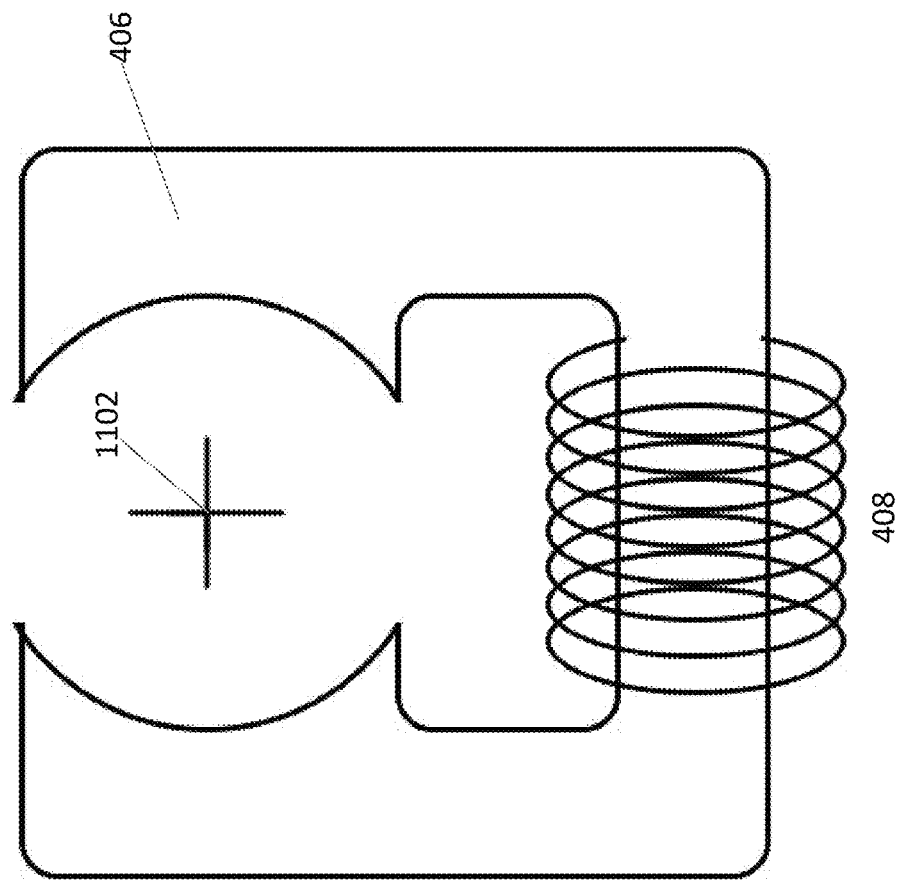
FIG. 11 is a diagram illustrating an alternative configuration of the stator of the reciprocating motor within the cryocooler.

FIG. 11 is a diagram 1100 illustrating an alternative configuration of the stator 406 of the reciprocating motor 204 of the cryocooler 102. The magnetic piston 402 and the pressurized container 404 can be placed such that an axis of the magnetic piston 402 and the pressurized container 404 can coincide with point 1102.

Figure 12:
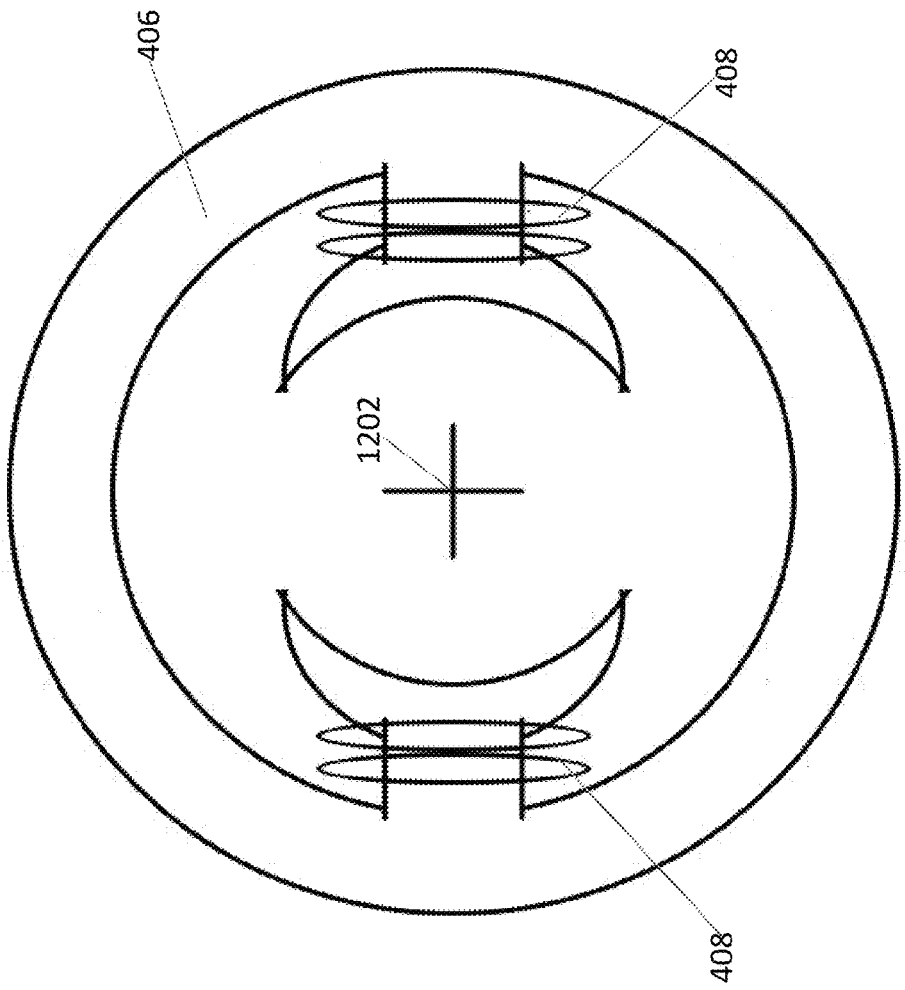
FIG. 12 is a diagram illustrating another alternative configuration of the stator of the reciprocating motor within the cryocooler.

FIG. 12 is a diagram 1200 illustrating another alternative configuration of the stator 406 of the reciprocating motor 204 of the cryocooler 102. The magnetic piston 402 and the pressurized container 404 can be placed such that an axis of the magnetic piston 402 and the pressurized container 404 can coincide with point 1202.

It may be noted that although the reciprocating motor 402 is described to be a part of the cryocooler 102, in other implementations, the reciprocating motor 402 can be used with other devices and for other purposes as well. Further, although a few variations have been described in detail above, other modifications can be possible. For example, the logic flows that can be interpreted from the description and/or figures herein may not require the particular order shown, or sequential order, to achieve desirable results. Further, same elements referred to herein by different reference numerals can be interchangeable in some implementations.

What is claimed is:

1. A pressure wave generator for an acoustic load comprising:
   a. a stator including at least one exterior surface and a pair of magnetic pole faces defining a space therebetween;
   b. a pressure cylinder having a longitudinal axis and received within the space defined between the pair of magnetic pole faces of the stator wherein the pair of magnetic pole face are disposed substantially diametrically opposed across the pressure cylinder and the pressure cylinder's longitudinal axis;
   c. an electrical coil wound around the at least one exterior surface of a portion of the stator external to and non-concentrically with respect to the pressure cylinder and configured to receive an alternating electrical current such that electromagnetic fields of alternating directions are formed between the pair of magnetic pole faces;
   d. a piston configured to slide linearly within the pressure cylinder and parallel to the longitudinal axis, said piston including a first permanent magnet portion asserting a first magnetic field in a first direction and a second permanent magnet portion asserting a second magnetic field in a second direction, said first and second permanent magnet portions being transversely oriented so that the first direction is opposite to the second direction and configured so that the piston reciprocates within the pressure cylinder as an alternating electrical current is applied to the electrical coil;

e. said pressure cylinder including a sealed first end and containing a gas between the sealed first end and the piston so that a gas spring is formed between the sealed first end and the piston;

f. said pressure cylinder including a second end including an opening configured to communicate with the acoustic load so that pressure waves of a working fluid are generated within the pressure cylinder between the piston and the second end of the pressure cylinder as the piston reciprocates, where the pressure waves exit the pressure cylinder via the opening.

2. The pressure wave generator of claim 1 wherein the pressure cylinder is slidably received within the space of the stator.

3. The pressure wave generator of claim 1 wherein the piston is at least partially covered by a low-frictional material positioned between the piston and an inner surface of the pressure cylinder.

4. The pressure wave generator of claim 1 further comprising a cooling fan configured to cool the stator and heat rejecters of a cryocooler that receives the pressure waves generated by the pressure wave generator.

5. The pressure wave generator of claim 1 wherein the stator has a thickness greater than a maximum stroke of the piston within the pressure cylinder.

6. The pressure wave generator of claim 1 wherein the piston has an axial length that is longer than two times a maximum stroke of the piston within the pressure cylinder.

7. The pressure wave generator of claim 1 wherein an axial length of each of the first and second permanent magnet portions of the piston is longer than an axial length of the stator.

8. The pressure wave generator of claim 1 wherein the first and second permanent magnet portions of the piston are adjacent so as to abut one another.

9. The pressure wave generator of claim 1 wherein a gap between the piston and an inner surface of the pressure cylinder is between zero microns and twenty-five microns.

10. A pressure wave generator for an acoustic load comprising:

a. first and second motors configured to cooperatively generate pressure waves received within the acoustic load, each motor including:
 i) a stator including at least one exterior surface and a pair of magnetic pole faces defining a space therebetween;
 ii) a pressure cylinder having a longitudinal axis and received within the space defined between the pair of magnetic pole faces of the stator wherein the pair of magnetic pole face are disposed substantially diametrically opposed across the pressure cylinder and the pressure cylinder's longitudinal axis;
 iii) an electrical coil wound around the at least one exterior surface of a portion of the stator external to and non-concentrically with respect to the pressure cylinder and configured to receive an alternating electrical current such that electromagnetic fields of alternating directions are formed between the pair of magnetic pole faces;
 iv) a piston configured to slide linearly within the pressure cylinder and parallel to the longitudinal axis, said piston including a first permanent magnet portion asserting a first magnetic field in a first direction and a second permanent magnet portion asserting a second magnetic field in a second direction, said first and second permanent magnet portions being transversely oriented so that the first direction is opposite to the second direction and configured so that the piston reciprocates within the pressure cylinder as an alternating electrical current is applied to the electrical coil;
 v) said pressure cylinder including a sealed first end and containing a gas between the sealed first end and the piston so that a gas spring is formed between the sealed first end and the piston;
 vi) said pressure cylinder including a second end including an opening configured to communicate with the acoustic load so that pressure waves of a working fluid are generated within the pressure cylinder between the piston and the second end of the pressure cylinder as the piston reciprocates, where the pressure waves exit the pressure cylinder via the opening.

11. The pressure wave generator of claim 10 wherein the pressure cylinder is slidably received within the space of the stator.

12. The pressure wave generator of claim 10 wherein the piston is at least partially covered by a low-frictional material positioned between the piston and an inner surface of the pressure cylinder.

13. The pressure wave generator of claim 10 further comprising a cooling fan configured to cool the stator and heat rejecters of a cryocooler that receives the pressure waves generated by the pressure wave generator.

14. The pressure wave generator of claim 10 wherein the stator has a thickness greater than a maximum stroke of the piston within the pressure cylinder.

15. The pressure wave generator of claim 10 wherein the piston has an axial length that is longer than two times a maximum stroke of the piston within the pressure cylinder.

16. The pressure wave generator of claim 10 wherein an axial length of each of the first and second permanent magnet portions of the piston is longer than an axial length of the stator.

17. The pressure wave generator of claim 10 wherein the first and second permanent magnet portions of the piston are adjacent so as to abut one another.

18. The pressure wave generator of claim 10 wherein a gap between the piston and an inner surface of the pressure cylinder is between zero microns and twenty-five microns.

19. The pressure wave generator of claim 1 wherein the acoustic load includes a heat exchanger portion of a Stirling-cycle cryocooler.

20. The pressure wave generator of claim 10 wherein the acoustic load includes a heat exchanger portion of a Stirling-cycle cryocooler.

* * * * *